(12) United States Patent
Schmit et al.

(10) Patent No.: US 11,428,118 B2
(45) Date of Patent: Aug. 30, 2022

(54) METHOD AND APPARATUS FOR PREDICTING TURBINE OUTLET TEMPERATURE IN GAS TURBINE

(71) Applicant: IHI Corporation, Tokyo (JP)

(72) Inventors: Nicolas Schmit, Tokyo (JP); Masato Kaniwa, Tokyo (JP); Yukihiro Kawano, Tokyo (JP); Shiho Sodekoda, Tokyo (JP)

(73) Assignee: IHI CORPOTATION, Tokyo (JP)

( * ) Notice: Subject to any disclaimer, the term of this patent is extended or adjusted under 35 U.S.C. 154(b) by 1004 days.

(21) Appl. No.: 16/147,931

(22) Filed: Oct. 1, 2018

(65) Prior Publication Data

US 2019/0032512 A1 Jan. 31, 2019

Related U.S. Application Data

(63) Continuation of application No. PCT/JP2017/022665, filed on Jun. 20, 2017.

(30) Foreign Application Priority Data

Jun. 22, 2016 (JP) .............................. JP2016-124009

(51) Int. Cl.
*G06N 20/00* (2019.01)
*F02C 9/00* (2006.01)
(Continued)

(52) U.S. Cl.
CPC .............. *F01D 25/002* (2013.01); *F02C 9/00* (2013.01); *G06N 20/00* (2019.01); *F02C 7/00* (2013.01);
(Continued)

(58) Field of Classification Search
CPC .. F01D 25/002; F02C 9/00; F02C 7/00; F02C 9/28; G06N 20/00; F05D 2260/81;
(Continued)

(56) References Cited

U.S. PATENT DOCUMENTS

2005/0096832 A1 5/2005 Takada et al.
2007/0118271 A1 5/2007 Wiseman et al.
(Continued)

FOREIGN PATENT DOCUMENTS

JP 2003-083089 A 3/2003
JP 2005-133583 A 5/2005
(Continued)

OTHER PUBLICATIONS

Portland State Aerospace Society, "A Quick Derivation relating altitude to air pressure," Version 1.03, Dec. 22, 2004, 4 pgs. <http://www.psas.pdx.edu>.
(Continued)

*Primary Examiner* — Peter D Nolan
*Assistant Examiner* — Ashley L Redhead, Jr.
(74) *Attorney, Agent, or Firm* — Volpe Koenig

(57) ABSTRACT

In a method for predicting a turbine outlet temperature at a future use of a gas turbine based on a past use thereof, the turbine outlet temperature (objective variable) at the future use is predicted by a turbine outlet temperature model by using a parameter (explanatory variable) in environmental and operational conditions planned for the future use and a rotating speed of a fan (explanatory variable) planned for the future use, and coefficients with respect to the explanatory variables are identified through a learning. In the learning, the coefficients are identified based on a regression learning of the explanatory variables and the objective variable of the turbine outlet temperature model made by using the parameter, the rotating speed of the fan and the turbine outlet temperature at the past use of the gas turbine.

12 Claims, 10 Drawing Sheets

(51) Int. Cl.
*F01D 25/00* (2006.01)
*F02C 7/00* (2006.01)

(52) U.S. Cl.
CPC .... *F05D 2260/81* (2013.01); *F05D 2260/821* (2013.01); *F05D 2270/11* (2013.01); *F05D 2270/303* (2013.01); *F05D 2270/304* (2013.01)

(58) Field of Classification Search
CPC ........... F05D 2260/821; F05D 2270/11; F05D 2270/303; F05D 2270/304; F05D 2270/44
See application file for complete search history.

(56) References Cited

U.S. PATENT DOCUMENTS

| | | | |
|---|---|---|---|
| 2011/0264408 A1 | 10/2011 | Welch et al. | |
| 2012/0072194 A1* | 3/2012 | Arnold | F02C 7/057 703/7 |
| 2016/0160679 A1* | 6/2016 | Griffiths | F01D 25/002 134/57 R |

FOREIGN PATENT DOCUMENTS

| | | |
|---|---|---|
| JP | 2007-002673 A | 1/2007 |
| JP | 2007-138921 A | 6/2007 |
| JP | 2011-529155 A | 12/2011 |

OTHER PUBLICATIONS

Cavcar, Mustafa, "The International Standard Atmosphere (ISA)," Anadolu University, 26470 Eskisehir, Turkey, Professor, School of Civil Aviation, 7 pgs.
Japanese Office Action, corresponding Japanese Application No. 2016-124009, dated Sep. 5, 2017, 5 pgs. (Japanese language only).
Japanese Office Action, corresponding Japanese Application No. 2016-124009, dated Feb. 6, 2018, 3 pgs. (Japanese language only).
Extended European Search Report dated Jan. 3, 2020 for the European Patent Application No. 17815391.2.
Kiakojoori et al., "Dynamic neural networks for gas turbine engine degradation prediction, health monitoring and prognosis," Neural Comput & Applic 27, 2157-2192 (2016).

* cited by examiner

METHOD AND APPARATUS FOR PREDICTING TURBINE OUTLET TEMPERATURE IN GAS TURBINE

CROSS-REFERENCE TO RELATED APPLICATIONS

The present application is a Continuation Application of PCT International Application No. PCT/JP2017/022665 (filed on Jun. 20, 2017), which is based upon and claims the benefit of priority from Japanese Patent Application No. 2016-124009 (filed on Jun. 22, 2016), the entire contents of which are incorporated herein by reference.

BACKGROUND

Technical Field

The present disclosure relates to a method and an apparatus for predicting a turbine outlet temperature in a gas turbine.

Related Art

Gas turbine engines are widely used as an aircraft jet engine, an electricity generating facility on land, a propulsion source and an electricity generating apparatus for ships/vessels, and so on. Deposits adhere to an inside of a gas turbine along with its continuous use. The deposits in the gas turbine change airflows introduced into the gas turbine, and thereby cause degradation of efficiency of an output power of the gas turbine. In order to maintain the output power by compensating the degradation of the efficiency of the output power, it is needed to increase combustion amounts of fuel. However, fuel efficiency degrades when the combustion amounts of fuel are increased.

Therefore, proposed is a technic for judging an appropriate timing for washing a gas turbine to which deposits have adhered. This proposal relates to a gas turbine used in a gas turbine plant. Loss costs due to the degradation of efficiency of an output power of the gas turbine having the deposits are estimated, and then it is determined that it is good time for the appropriate washing timing when the estimated loss costs become equal to costs required for washing the inside of the gas turbine (Japanese Patent Application Laid-Open No. 2005-133583).

SUMMARY

In a gas turbine, when combustion amounts of fuel are increased in order to maintain an output power, a turbine outlet temperature rises. In a case of a multistage turbine, a turbine outlet temperature of each stage rises. Since an upper limit temperature is set for a gas turbine in order to restrict deterioration of its components, it must be prevented that the turbine outlet temperature rises higher than the upper limit temperature. Therefore, washing of an inside of a gas turbine is very important not only in view of loss costs due to degradation of efficiency of an output power but also in view of management for preventing the turbine outlet temperature from rising higher than its upper limit temperature.

A current outlet temperature of a turbine can be measured by a sensor, but a future temperature can be only estimated. Therefore, a washing timing for an inside of a gas turbine determined based on the future outlet temperature of the turbine tends to depend on experiences of a maintenance crew. As the result, the determination of the washing timing is subject to a richly-experienced maintenance crew.

It is because that it is generally difficult to share experiences of a specific maintenance crew with other maintenance crews. In addition, it is also because that it takes a long period to impart knowledges got by a richly-experienced maintenance crew through his/her experiences to a less-experienced maintenance crew. Therefore, if the number of gas turbines for which washing time should be determined increases, a specific maintenance crew must bear a heavy burden for his operations.

Further, since experiences differ from person to person, a washing timing determined may vary from person to person even in a case where richly-experienced maintenance crews determine a washing timing. If this variation is regarded as error, washing operation must be done earlier by this error than the determined washing timing. As the result, the number of washings may increase beyond necessity.

An object of the present disclosure is to provide a method for predicting a turbine outlet temperature of a gas turbine without depending on a richly-experienced maintenance crew, and an apparatus appropriate for carrying out this method.

A first aspect of the present disclosure provides a method for predicting a turbine outlet temperature at a future use of a gas turbine based on a past use of the gas turbine, the gas turbine getting an output power by compressing air introduced by a fan and then combusting the air together with fuel, the method comprising: an outlet temperature prediction step for predicting, by a turbine outlet temperature model, the turbine outlet temperature at the future use that is an objective variable by using at least one parameter in environmental and operational conditions planned for the future use of the gas turbine and a rotating speed of the fan planned for the future use as explanatory variables; and a learning step for identifying coefficients with respect to the explanatory variables, the learning step being done every time when a given learning trigger is satisfied, wherein, in the learning step, based on a result of a regression learning of the explanatory variables and the objective variable of the turbine outlet temperature model that is made by using the parameter, the rotating speed of the fan and the turbine outlet temperature at the past use of the gas turbine.

A "gas turbine" referred here is an all-inclusive term of an internal combustion engine that gets its output power by rotating a "turbine(s)" by a fluid flow(s) got through combustion of fuel. For example, jet engines and electricity generating equipment of airplanes and engines of helicopters or ships/vessels are also included in the "gas turbine".

Therefore, a "turbine" extracts kinetic energies from fluid in a "gas turbine". In a case where a "gas turbine" has a multistage turbine such as a high pressure turbine and a low pressure turbine, all these turbines fall within the "turbine".

In addition, a "turbine outlet temperature" is an outlet temperature of a turbine(s) in a gas turbine. In a case where a "gas turbine" has a multistage turbine, every outlet temperature of a turbine in each stage falls within the "turbine outlet temperature".

The above explained definitions of the "gas turbine", the "turbine" and the "turbine outlet temperature" should be applied to all terms used in following descriptions and claims.

Here, the method for predicting the turbine outlet temperature may further comprise: a rotating speed prediction step for predicting, by a control system model of the gas turbine, the rotating speed of the fan at the future use of the gas turbine by using the environmental and operational conditions planned for the future use, wherein the rotating speed of the fan at the future use that is predicted in the rotating speed prediction step may be used as the rotating speed of the fan planned for the future use that is used in the outlet temperature prediction step.

Or, the method for predicting the turbine outlet temperature may further comprise: a washing timing prediction step for predicting a washing timing when the turbine outlet temperature at the future use will reach a washing temperature that requires washing of the gas turbine based on a plurality of turbine outlet temperatures at future uses predicted in the outlet temperature prediction step.

In addition, the method for predicting the turbine outlet temperature may further comprise: an error distribution detection step for detecting, every time when a given update condition is satisfied, an error distribution of, with respect to the turbine outlet temperature at a use of the gas turbine after the given update condition is satisfied, the turbine outlet temperature predicted in a past in the outlet temperature prediction step for the turbine outlet temperature at the use of the gas turbine after the given update condition is satisfied, wherein, in the washing timing prediction step, the washing timing may be predicted by using a percentage corresponding to an excess over the washing temperature in the error distribution whose representative value is the turbine outlet temperature predicted in the outlet temperature prediction step as a probability of a rise of the turbine outlet temperature at the future use up to the washing temperature.

Or, in the method for predicting the turbine outlet temperature, the rotating speed of the fan and the parameter within a period until the number of uses of the gas turbine after washing of the gas turbine reaches a predetermined times or within a period until used hours of the gas turbine after washing of the gas turbine reach predetermined hours, may be excluded from a target of the regression learning in the learning step.

Or, in the method for predicting the turbine outlet temperature, when a given start condition is satisfied after washing of the gas turbine, the turbine outlet temperature may be predicted in the outlet temperature prediction step.

A second aspect of the present disclosure provides an apparatus for predicting a turbine outlet temperature comprising: an outlet temperature predictor that predicts, by a turbine outlet temperature model, the turbine outlet temperature at a future use of a gas turbine that is an objective variable by using at least one parameter in environmental and operational conditions at the future use of the gas turbine and a rotating speed of a fan at the future use as explanatory variables; a leaning data storage that stores a learning database in which the parameter and the rotating speed of the fan at a past use of the gas turbine are associated with the turbine outlet temperature at the past use; and a learning executor that identifies, every time when a given learning trigger is satisfied, coefficients with respect to the explanatory variables based on a result of a regression learning of the explanatory variables and the objective variable of the turbine outlet temperature model that is made by using the parameter, the rotating speed of the fan and the turbine outlet temperature associated therewith in the learning database stored in the leaning data storage.

Here, the apparatus for predicting the turbine outlet temperature may further comprise: a rotating speed predictor that predicts, by a control system model of the gas turbine, the rotating speed of the fan at the future use of the gas turbine by using the environmental and operational conditions at the future use, wherein the outlet temperature predictor may use the rotating speed of the fan at the future use that is predicted by the rotating speed predictor as the explanatory variable for predicting the turbine outlet temperature by using the turbine outlet temperature model.

Or, the apparatus for predicting the turbine outlet temperature may further comprise: a washing timing predictor that predicts a washing timing when the turbine outlet temperature at the future use will reach a washing temperature that requires washing of the gas turbine based on a plurality of turbine outlet temperatures at future uses predicted by the outlet temperature predictor.

In addition, the apparatus for predicting the turbine outlet temperature may further comprise: an error distribution detector that detects, every time when a given update condition is satisfied, an error distribution of, with respect to the turbine outlet temperature at a use of the gas turbine after the given update condition is satisfied, the turbine outlet temperature predicted in a past by the outlet temperature predictor for the turbine outlet temperature at the use of the gas turbine after the given update condition is satisfied, wherein the washing timing predictor may predict the washing timing by using a percentage corresponding to an excess over the washing temperature in the error distribution whose representative value is the turbine outlet temperature predicted by the outlet temperature predictor as a probability of a rise of the turbine outlet temperature at the future use up to the washing temperature.

Or, the apparatus for predicting the turbine outlet temperature may further comprise: a learning exclusion setter that excludes, from a target of the regression learning by the learning executor, the rotating speed of the fan and the parameter within a period until the number of uses of the gas turbine after washing of the gas turbine reaches a predetermined times or within a period until used hours of the gas turbine after washing of the gas turbine reach predetermined hours, wherein the learning executor may make the regression learning by using the rotating speed of the fan and the parameter in the learning database stored in the learning data storage, other than the rotating speed of the fan and the parameter that are excluded by the learning exclusion setter.

Or, when a given start condition is satisfied after washing of the gas turbine, the outlet temperature predictor may predict the turbine outlet temperature.

DESCRIPTION OF EMBODIMENT

Hereinafter, an embodiment will be described with reference to the drawings.

Figure 1:
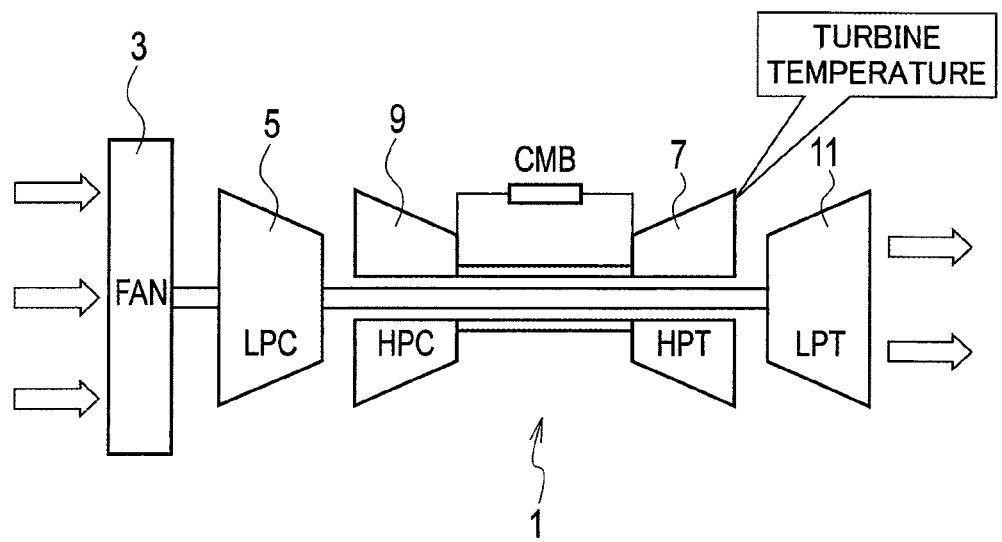
FIG. 1 is a schematic configurational drawing of a jet engine in an airplane as a gas turbine to which a predicting method according to an embodiment is applied.

As shown in FIG. 1, a jet engine 1 of an airplane as a gas turbine to which a predicting method according to the embodiment is applied is housed in an inside of an engine case (not shown in the figure). In the jet engine 1, air introduced from an air intake port into the inside of the case by a fan 3 is compressed by a low pressure compressor 5 and a high pressure compressor 9 and then mixed with fuel, and the mixed air is combusted.

The combustion gas rotates a high pressure turbine 7 to generate a drive force for rotating the high pressure compressor 9 at a subsequent stage to the low pressure compressor 5. In addition, the combustion gas that has passed through the high pressure turbine 7 is ejected from the engine gas to generate a propulsion force. Part of the combustion gas rotates a low pressure turbine 11 at a subsequent stage to the high pressure turbine 7 to generate a drive force for rotating the fan 3 and the low pressure compressor 5. Temperature of the high pressure turbine 7 increases to the highest temperature in the jet engine 1, and thereby it is thermally deteriorated most.

Deposits adhere to an inside of the jet engine 1 due to repeated takeoffs and landings. The deposits change a flow(s) of air for combustion inside the jet engine 1, and thereby cause degradation of output power efficiency of the jet engine 1. When combustion amounts of fuel are increased in order to maintain the output power (propulsion force) by compensating the degradation of output power efficiency, outlet temperature of the high pressure turbine 7 or the low pressure turbine 11 (an turbine outlet temperature) increases even in order to get the same output power (propulsion force).

When the outlet temperature of the high pressure turbine 7 or the low pressure turbine 11 (hereinafter, it will be also referred as "turbine temperature") increases higher than an upper limit temperature that is set in order to restrict deterioration of its components, operations of the airplane have to be stopped for a long time to replace the deteriorated components. Therefore, it is desired to carry out washing (water washing) of the jet engine 1 before the turbine temperature increases higher than the upper limit temperature. Maintenance costs of the airplane can be suppressed more by washing than by replacing components.

On the other hand, if washings (water washings) of the jet engine 1 are done at short intervals beyond necessity, operations of the airplane have to be stopped temporarily for the washings even in a state where the turbine temperature doesn't increase higher than the upper limit temperature. In this case, the airplane cannot be operated with high efficiency. In addition, maintenance costs of the air plane increase by carrying out washings frequently beyond necessity.

Figure 2:
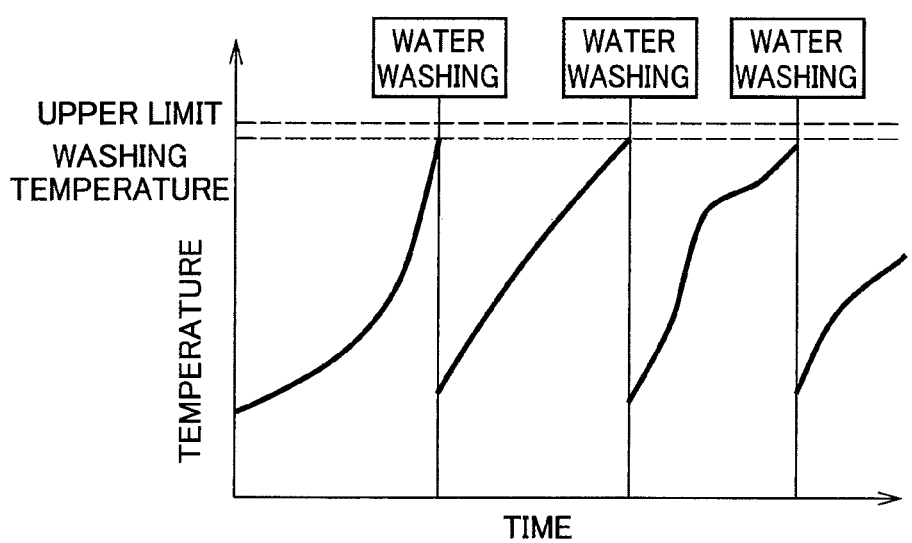
FIG. 2 is a graph that shows relationships between changes of a turbine outlet temperature and water washing (s) in the jet engine.

Therefore, it is preferable to remove deposits in the inside of the jet engine 1 by carrying out washing (water washing) at a timing when the turbine outlet temperature (a vertical axis of a graph in FIG. 2) reaches, due to repeated uses of the jet engine 1, a washing temperature (i.e. a temperature that requires washing of a gas turbine) that is slightly lower than the upper limit temperature set for restricting deterioration of turbine components.

An airflow(s) for combustion in the inside of the jet engine 1 gets better by removing the deposits, and thereby degraded efficiency of an output power of the jet engine 1 gets better again. As the result, the turbine temperature can be reduced by reducing fuel combusted for getting the same output power (propulsion force).

Note that, in a case for regarding the outlet temperature of the high pressure turbine 7 as the turbine temperature, a temperature slightly lower than the upper limit temperature of the turbine outlet associated with the high pressure turbine 7 is set as the washing temperature. Or, in a case for regarding the outlet temperature of the low pressure turbine 11 as the turbine temperature, a temperature slightly lower than the upper limit temperature of the turbine outlet associated with the low pressure turbine 11 is set as the washing temperature.

Further, a temperature of an outlet of an entire of the jet engine 1, that is different from the outlet of the high pressure turbine 7 and the outlet of the low pressure turbine 11, may be regarded as the turbine temperature, and thereby a temperature slightly lower than the upper limit temperature of the entire of the jet engine 1 may be set as the washing temperature.

Figure 3:
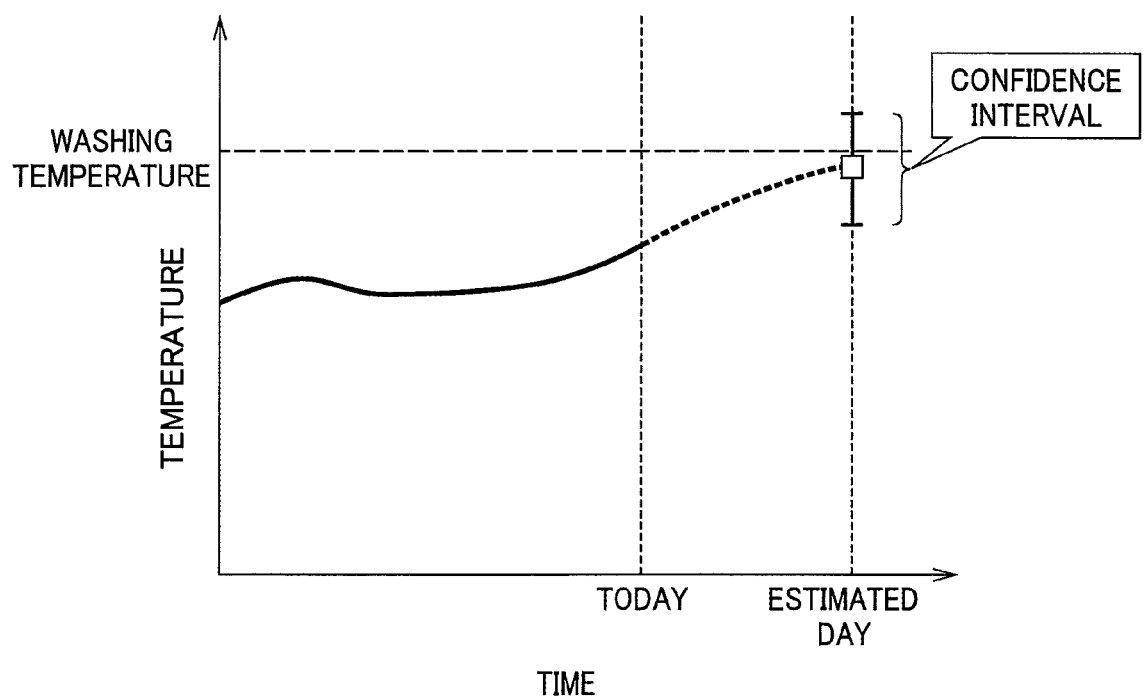
FIG. 3 is a graph that conceptually shows changes of a predicted turbine outlet temperature in the jet engine.

A current turbine temperature of the jet engine 1 can be monitored as the turbine outlet temperature by a sensor (not shown in figures) disposed at the outlet of (downstream from) the high pressure turbine 7 or at the outlet of (downstream from) the low pressure turbine 11. However, only by monitoring the current turbine outlet temperature, it is impossible to preliminarily determine schedule for washing (water washing) the jet engine 1 and carry out washing (water washing) in a planned manner. Therefore, in the present embodiment, a turbine outlet temperature at a future use of the jet engine 1 is predicted as shown in a graph in FIG. 3 in order to preliminarily determine the schedule of washing (water washing).

Note that the turbine outlet temperature may vary according to various conditions while using the jet engine 1. Therefore, the predicted future turbine outlet temperature may vary to some extent depending on how assuming conditions of its future use.

In the predicting method of the turbine outlet temperature according to the present embodiment, a range into which a predicted value of the turbine outlet temperature falls with a high probability to some degree is set as a confidence interval. The timing for washing (water washing) of the jet engine 1 is preliminarily predicted based on relationship between the temperature range and the washing temperature of this confidence interval. By preliminarily predicting the washing timing, it becomes possible to preliminarily plan schedule for efficiently stopping operations of jet engine 1, without waste, for washing (water washing).

Hereinafter, explained will be various processes done for predicting the turbine outlet temperature of the jet engine 1 in the predicting method of the turbine outlet temperature according to the present embodiment. Note that specific steps for predicting the turbine outlet temperature by using the processes and so on will be explained in detail after the explanations of the various processes.

Figure 4:
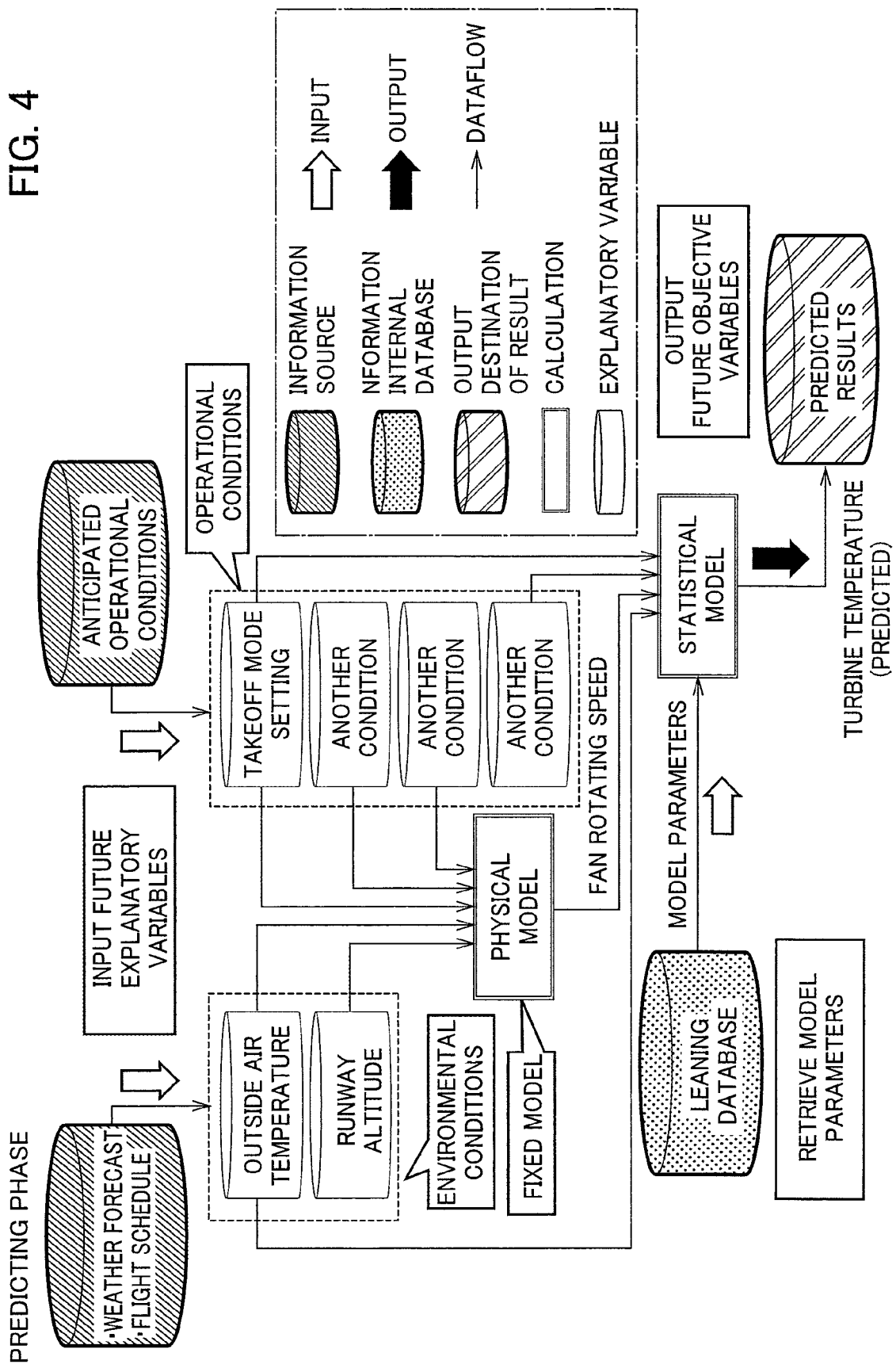
FIG. 4 is a schematic drawing that shows processes of prediction of the turbine outlet temperature in the jet engine.

As shown in FIG. 4, the turbine outlet temperature ("TURBINE TEMPERATURE (PREDICTED)" in the figure) of the jet engine 1 at a future takeoff of an airplane (not shown in the figure) provided with the jet engine 1 is predicted first. Note that the predicted future turbine outlet temperature may be temperature at a time other than a takeoff. However, the jet engine 1 is used with its highest load at a takeoff of the airplane, and thereby it is reasonable to predict the turbine outlet temperature at a takeoff of the airplane where the turbine outlet temperature rises highest.

Note that the turbine outlet temperature is predicted by using a model (turbine outlet temperature model, "STATISTICAL MODEL" in the figure) for predicting the turbine outlet temperature based on a rotating speed of the fan 3 (i.e. an index of a combusted air volume introduced into the inside of the engine case) and environmental and operational conditions at a takeoff of the airplane.

The rotating speed of the fan 3 at a use of the jet engine 1 is controlled base on a command value set by an airplane digital control device (not shown in the figure: FADEC (Full Authority Digital Engine Control)) installed in the airplane. This command value is determined based on the environmental and operational conditions at the use of the jet engine 1 and so on.

Namely, the rotating speed of the fan 3 at a use of the jet engine 1 can be predicted based on the environmental and operational conditions at the use of the jet engine 1 and so on by using a control system model ("PHYSICAL MODEL" in the figure) that is made by modeling control operations of a control system of the jet engine 1 by the FADEC.

Therefore, the rotating speed of the fan 3 at a use of the jet engine 1, used for predicting the turbine outlet temperature, is predicted by using the control system model based on the environmental and operational conditions at a takeoff of the jet engine 1 and so on.

Since the control system model for predicting the rotating speed of the fan 3 is the physical model made by modeling the control operations of the control system of the jet engine 1 by the FADEC, contents of the model are basically fixed unless the airplane 1 is changed.

On the other hand, since contents of the turbine outlet temperature model for predicting the turbine outlet temperature don't become stereotypically-fixed contents. It is because the turbine outlet temperature is not uniquely determined based on a control operation (s) of the control system like as the rotating speed of the fan 3 but varies along with the environmental and operational conditions at a use such as a layout of the jet engine 1 in the airplane, flight conditions of the airplane and so on.

Therefore, for the turbine outlet temperature model, coefficients with respect to parameters, in the environmental and operational conditions at a use of the jet engine 1, used for predicting the turbine outlet temperature as explanatory variables of the model are identified (determined) through the learning. Then, the coefficients identified through the latest learning are used when predicting the turbine outlet temperature. Note that the learning of the coefficients with respect to the parameters used as the explanatory variables of the model will be explained in detail later.

When predicting the turbine outlet temperature at a takeoff of the airplane 13 by using the turbine outlet temperature model, the rotating speed of the fan 3 at the takeoff is needed. As explained above, this rotating speed of the fan 3 is predicted by the control system model.

The prediction of the rotating speed of the fan 3 by using the control system model is done in a management system host(s) 25, 27 (see FIG. 5) similarly to the prediction of the turbine outlet temperature by using the turbine outlet temperature model. In the management system host(s) 25, 27, the environmental and operational conditions of the jet engine 1 at the takeoff of the airplane 13, that are required for predicting the rotating speed of the fan 3 by using the control system model, are retrieved or specified from ACARS (Automatic Communications Addressing and Reporting System) data or maintenance information.

For example, the environmental conditions of the jet engine 1 at an actual takeoff of the airplane 13 include at least an outside air temperature and a geographical condition(s) such as an altitude of a departure airport where the airplane 13 takes off that affect the turbine outlet temperature.

The outside air temperature can be retrieved by utilizing weather information data for the takeoff transmitted from the management system host 25 of an airline (aviation company) to the airplane 13 through the ACARS, for example. The condition(s) such as an altitude of a departure airport can be specified in the management system host(s) 25, 27 of the airline or a maintenance company by utilizing data of a departure place in the ACARS data, for example.

In addition, the operational conditions of the jet engine 1 at an actual takeoff of the airplane 13 include at least a takeoff mode adopted at the takeoff of the airplane 13. The takeoff mode can be retrieved from maintenance information of its concerned flight at a later date, for example.

Therefore, the rotating speed of the fan 3 at a takeoff of the airplane 13 can be predicted, by using the control system model, from the environment and operational conditions of the jet engine 1 at an actual takeoff that are retrieved as explained above.

Figure 6:
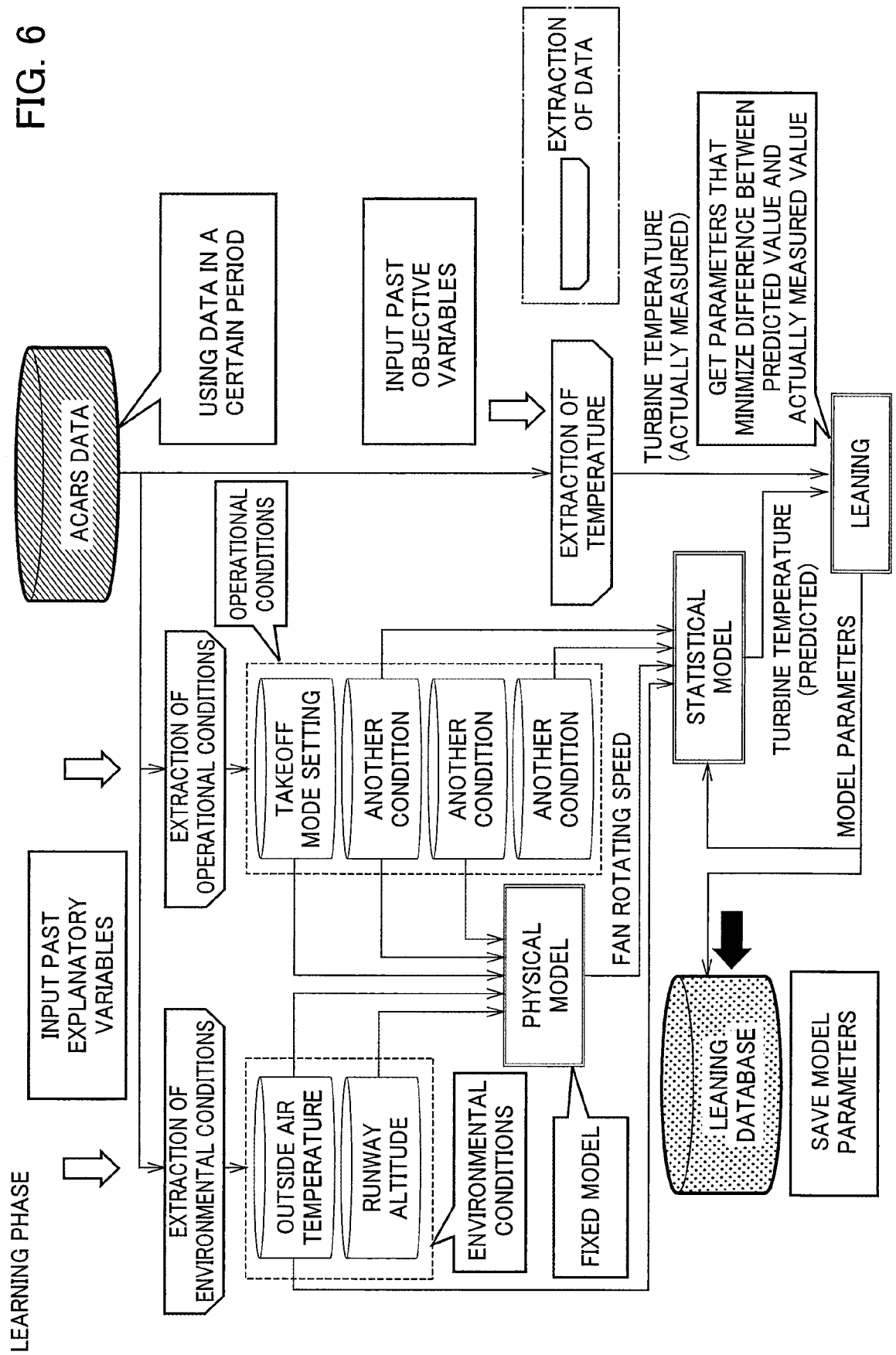
FIG. 6 is a schematic drawing that shows processes of learning of a turbine outlet temperature model in FIG. 4.

Note that the rotating speed of the fan 3 at an actual takeoff of the airplane 13 that is predicted by using the control system model, the environment and operational conditions of the jet engine 1 at the actual takeoff of the airplane 13 that is used for that prediction, and the turbine outlet temperature of the jet engine 1 at the actual takeoff of the airplane 13 retrieved from the ACARS data are associated with each other, and then stored in a learning database (see FIG. 6). This learning database will be explained later in detail.

Figure 5:
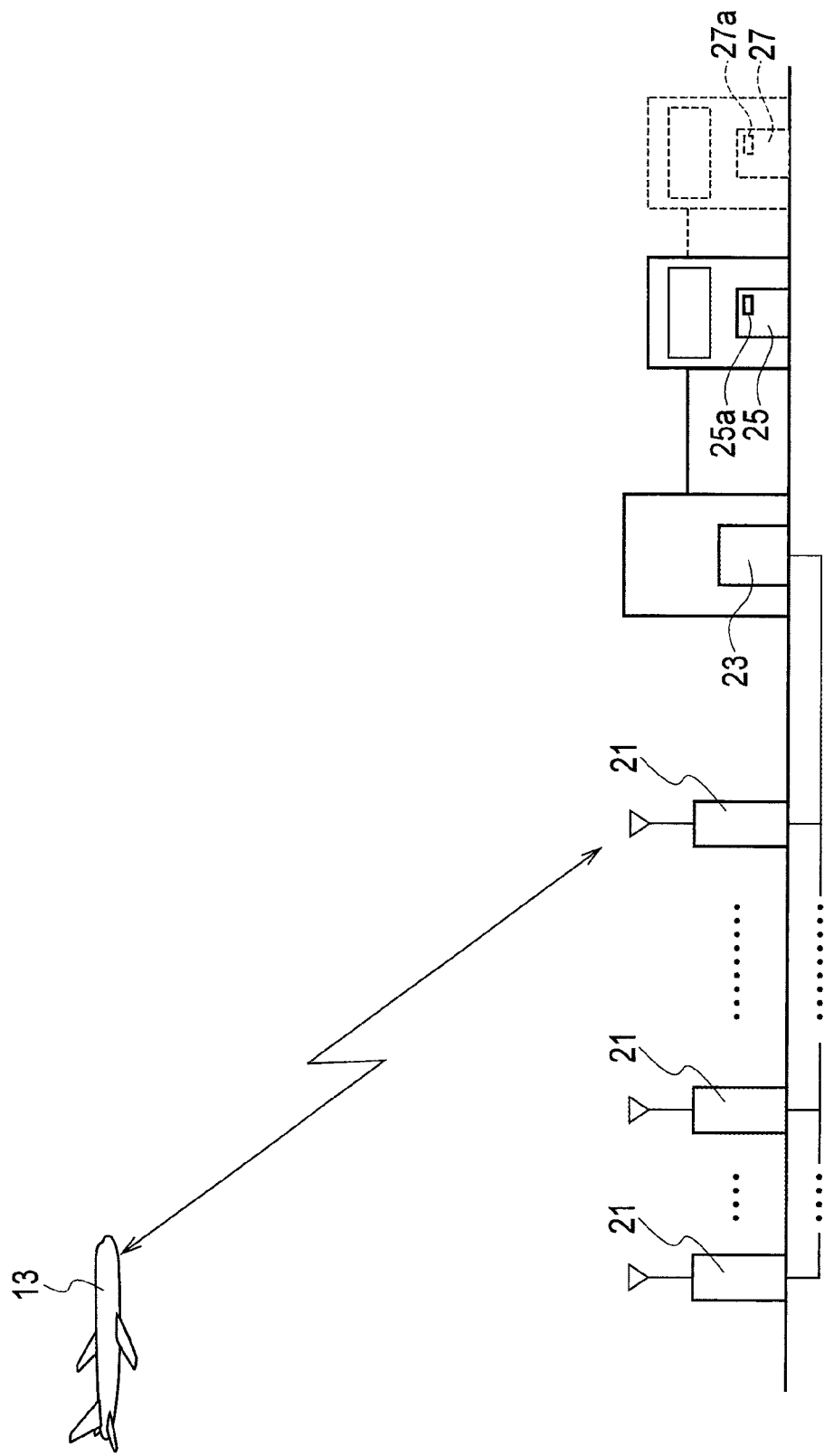
FIG. 5 is a schematic configurational diagram of an ACARS in which ACARS data in FIG. 4 is sent and received.

Then, the prediction of the turbine outlet temperature at a future takeoff of the airplane 13 (at a future use of the gas turbine: at a future use of the jet engine 1) by the turbine outlet temperature model using the coefficients identified through the latest learning is done in the management system host (s) 25, 27 (see FIG. 5). Namely, in the present embodiment, a (future/actual/past) takeoff of the airplane 13 where the turbine outlet temperature increases to the highest temperature is used as a (future/actual/past) use of the gas turbine, i.e. the jet engine 1.

The management system host 25 of the airline can transmit a flight plan, weather information data and so on to the airplane 13 via an integrated processing host computer 23 and radio stations 21 of the ACARS (an air-ground digital data link system).

In addition, data such as a flight number, a departure place and a destination, a departure time and a arrival time (incl. date), the rotating speed of the fan 3, and the turbine outlet temperature are sent from the airplane 13 to the radio stations 21 on the ground. The data sent to the radio stations 21 are sent to the integrated processing host computer 23 of the ACARS, and then transmitted to the management system host 25 of the airline after its format is converted.

The data transmitted between the airplane and the ground by using the ACARS are called as the ACARS data.

Note that, in a case where maintenances of the airplanes 13 provided with the jet engine 1 are done by the maintenance company entrusted by the airline, the data transmitted from the airplane 13 to the management system host 25 of the airline and the data transmitted from the management system host 25 of the airline to the airplane 13 are also transmitted to the management system host 27 of the maintenance company.

In addition, the maintenance information copied, by a crew of a maintenance department of the airplane 13, from a log book made for each flight by a cockpit crew of the airline is manually input to the management system host(s) 25, 27 that predicts the turbine outlet temperature at a future takeoff of the airplane 13. This maintenance information includes information about the operational conditions of the jet engine 1 at a takeoff of the airplane 13, such as a flight number and a takeoff mode, for example.

When predicting the turbine outlet temperature at a future takeoff of the airplane 13 by using the turbine outlet temperature model, the takeoff is not yet done and thereby the environmental and operational conditions of the jet engine 1 are not yet fixed. Since the above mentioned environmental and operational conditions retrieved or specified from the ACARS data or the maintenance information are current conditions, the rotating speed of the fan 3 at a future takeoff of the airplane 13 cannot be predicted, through the control system model, by utilizing these environmental and operational conditions.

Instead, the outside air temperature included in the environmental conditions of the jet engine 1 at a future takeoff of the airplane 13 can be predicted by utilizing weather forecast data of future date/time for the takeoff of the airplane 13, for example. In addition, the condition(s) such as an altitude of a departure airport can be specified in the management system host(s) 25, 27 by specifying a departure place of the future date/time for the takeoff of the airplane 13 from an operation schedule of the airplane 13 and then inputting it manually to the management system host(s) 25, 27 of the airline or the maintenance company, for example.

In addition, with respect to the takeoff mode included in the operational conditions of the jet engine 1 and to be adopted at the future takeoff of the airplane 13, the takeoff mode associated with a departure place can be specified in the management system host(s) 25, 27 by specifying the departure place of the future date/time for the takeoff of the airplane 13 from a flight schedule of the airplane 13 and then inputting it manually to the management system host(s) 25, 27 of the airline or the maintenance company, for example.

Therefore, also with respect to the future takeoff of the airplane 13 at which the environmental and operational conditions of the jet engine 1 cannot be retrieved or specified from the ACARS data or the maintenance information, the rotating speed of the fan 3 can be predicted, by using the control system model, from the environmental and operational conditions of the jet engine 1 at the takeoff of the airplane 13 that are predicted as explained above.

In other words, even if it is impossible to specify a rotating speed of the fan 3 planned for a future use, the rotating speed of the fan 3 at the future use can be specified by using the control system model in a case where the environmental and operational conditions planned for the future use can be specified.

Then, the turbine outlet temperature of the jet engine 1 at the future takeoff of the airplane 13 can be predicted, by using the turbine outlet temperature model, from the rotating speed of the fan 3 at the future takeoff of the airplane 13 and the environmental and operational conditions of the jet engine 1 at the future takeoff of the airplane 13 that are used for predicting the rotating speed of the fan 3.

Note that the rotating speed of the fan 3 at a future takeoff of the airplane 13 that is predicted by using the control system model and the environmental and operational conditions of the jet engine 1 at the future takeoff of the airplane 13 that are used for predicting the rotating speed of the fan 3 are associated with the turbine outlet temperature of the jet engine 1 at the future takeoff of the airplane 13 that is predicted from them by using the turbine outlet temperature model, and then stored in the above mentioned learning database (see FIG. 6).

The learning database is stored in a learning data storage(s) (e.g. hard disk(s)) 25a, 27a of the management system host(s) 25, 27 of the airline or the maintenance company that predicts the turbine outlet temperature by using the turbine outlet temperature model.

Then, the rotating speeds of the fan 3, the environmental and operational conditions of the jet engine 1 and the turbine outlet temperature data at actual takeoffs of the airplane 13, that are store in the learning database, are read out from the hard disk(s) 25a, 27a and then utilized for regression learnings for identifying the above mentioned coefficients of the explanatory variables of the turbine outlet temperature model.

In addition, the turbine outlet temperatures at a future takeoffs of the airplane 13 and the turbine outlet temperatures at actual takeoffs of the airplane 13, that are stored in the learning database, are read out from the hard disk (s) 25a, 27a and then utilized for calculating a normal distribution of errors of the turbine outlet temperatures at the future takeoffs of the airplane 13 that are predicted by using the turbine outlet temperature model. The calculation of the normal distribution of errors will be explained later.

Then, by the turbine outlet temperature model, the turbine outlet temperature at a future takeoff of the airplane 13 is predicted for plural time points, and thereby a washing timing when the predicted turbine outlet temperature will reach the washing temperature is specified. In this manner, the washing timing when the predicted turbine outlet temperature will reach the washing temperature is predicted.

By predicting the washing timing when the turbine outlet temperature at a future takeoff of the airplane 13 will reach the washing temperature, an appropriate timing for removing deposits by washing to improve combustion efficiency of the jet engine 1 is predicted before the turbine outlet temperature at a future takeoff of the airplane 13 rises up to the upper limit temperature that requires a component replacement (s). Then, based on this prediction, washing(s) of the jet engine 1 can be done efficiently in a planned manner.

Note that the environmental and operational conditions planned for a future takeoff that are used in the prediction of the turbine outlet temperature of the jet engine 1 at the future takeoff of the airplane 13 and used in the prediction of the rotating speed of the fan 3 used for the above prediction of the turbine outlet temperature may differ from the environmental and operational conditions at an actual takeoff of the airplane 13.

Figure 7A:
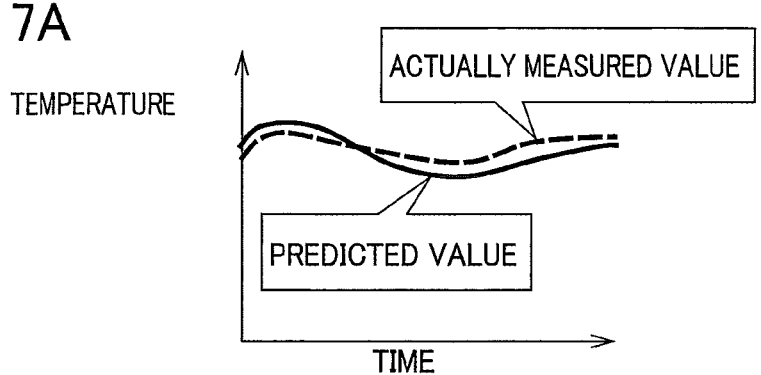
FIG. 7A is a graph that shows time changes of a measured value and a predicted value.
Figure 7B:
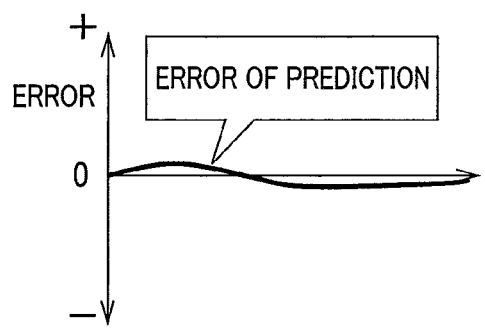
FIG. 7B is a graph that shows a change of a prediction error.

If the environmental and operational conditions planned when predicting the turbine outlet temperature of the jet engine 1 or the rotating speed of the fan 3 differ from the actual environmental and operational conditions, an error occurs between the turbine outlet temperature predicted by using the turbine outlet temperature model (a predicted value) and the turbine outlet temperature actually measured (an actually measured value) as shown by a graph in FIG. 7A, for example. The error is not always constant, but its amplitude and its plus/minus change as time elapses as shown by a graph in FIG. 7B.

Therefore, in the predicting method of the turbine outlet temperature according to the present embodiment, an error between the turbine outlet temperature measured at an actual takeoff of the airplane 13 and the turbine outlet temperature predicted for that takeoff in the past is taken into consideration. Then, the washing timing when the predicted turbine outlet temperature will reach the washing temperature is predicted in consideration of a range of the error distribution in the management system host(s) 25, 27 of the airline or the maintenance company.

Specifically, with respect to each takeoff of the airplanes 13 for which the turbine outlet temperature (predicted value) was predicted in the past by the turbine outlet temperature model by using predictions of future environmental and operational conditions, the turbine outlet temperature (actually measured value) at its actual takeoff is extracted from the learning database (see FIG. 6).

Figure 7C:
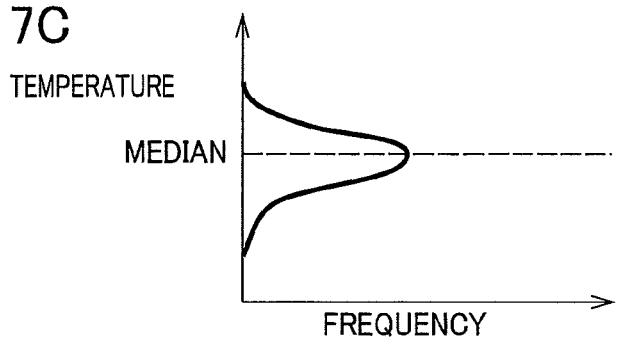
FIG. 7C is a graph that shows a normal distribution of the error.

Then, with the actual turbine outlet temperature (actually measured value) at each takeoff regarded as a median, a normal distribution of the errors of the turbine outlet temperatures (predicted values) predicted for each takeoff in the past for the median (actually measured value) (see a graph in FIG. 7C). This normal distribution indicates the error distribution of the turbine outlet temperatures (predicted values) at a future takeoff of the airplane 13 that were predicted by the turbine outlet temperature model by using the future environmental and operational conditions. Note that a median is used as a representative value for considering the error distribution but an average or a mode may be used as the representative value.

Figure 7D:
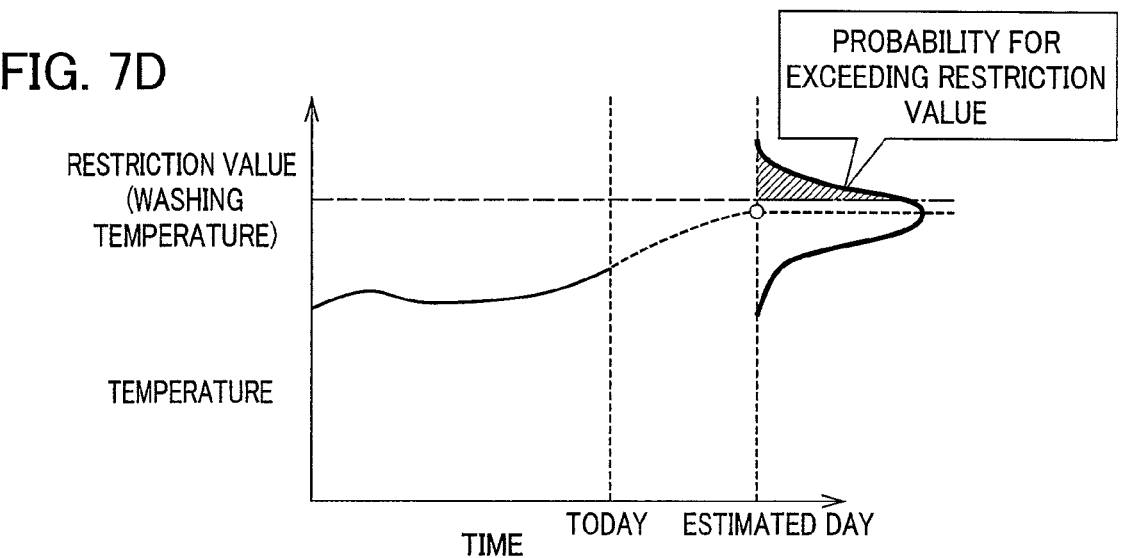
FIG. 7D is a graph that shows a process for detecting certainty degree of prediction of a turbine outlet temperature in consideration of the error.

Therefore, as shown by a graph in FIG. 7D, a percentage for exceeding the washing temperature in this error distribution is calculated. This percentage means a probability of a rise of the turbine outlet temperature at a future takeoff of the airplane 13 up to a temperature that requires washing.

In consideration of the percentage of a rise of the turbine outlet temperature at a future takeoff of the airplane 13 up to a temperature that requires washing of the jet engine 1, it is specified whether or not the turbine outlet temperature at the takeoff will reach the temperature that requires washing. As the result, an appropriate timing for washing of the jet engine 1 can be preliminarily determined efficiently in a planned manner.

Therefore, the management host (s) 25, 27 of the airline or the maintenance company constitutes a predicting apparatus of the turbine outlet temperature that predicts the turbine outlet temperature by using the predicting method of the turbine outlet temperature according to the present embodiment.

Note that deposits of the jet engine 1 are small within a period until the number of flights (uses) of the airplane 13 after washing of the jet engine 1 reaches at least predetermined times (e.g. five times after washing), or within a period until flight hours (used hours) of the airplane 13 after washing of the jet engine 1 reach predetermined hours. Therefore, within such a period, the necessity for frequently predicting the turbine outlet temperature at a future takeoff of the airplane 13 is not high.

Instead, the necessity for frequently predicting the turbine outlet temperature at a future takeoff of the airplane 13 becomes high in a condition where the turbine outlet temperature at a future takeoff is going to reach the upper limit temperature when the airplane 13 has made many flights repeatedly after washing of the jet engine 1.

Then, an increase rate of the turbine outlet temperature along with an increase of deposits of the jet engine 1 caused by the repeated flights of the airplane 13 is obviously different between at a time when just after washing of the jet engine 1 and at a time when many flights have been made repeatedly after washing of the jet engine 1.

Therefore, it is unreasonable to predict the turbine outlet temperature by using environment and operational conditions just after washing of the jet engine 1 under a condition where many flights have been made repeatedly after washing of the jet engine 1, i.e. a condition where the necessity for frequently predicting the turbine outlet temperature at a future takeoff is high.

Hence, in the predicting method of the turbine outlet temperature according to the present embodiment, the prediction of the turbine outlet temperature by using the turbine outlet temperature model is not made within a period until the number of flights (uses) of the airplane 13 after washing of the jet engine 1 reaches at least predetermined times (e.g. five times after washing), or within a period until flight hours (used hours) of the airplane 13 after washing of the jet engine 1 reach predetermined hours. Thus, it becomes possible to predict the turbine outlet temperature with high accuracy by using the turbine outlet temperature model.

Namely, in the present embodiment, a start condition for predicting the turbine outlet temperature is a condition where the number of flights (uses) of the airplane 13 after washing of the jet engine 1 reaches at least the predetermined times, or a condition where the flight hours (used hours) of the airplane 13 after washing of the jet engine 1 reach the predetermined hours.

Note that a period where no prediction of the turbine outlet temperature, by using the turbine outlet temperature model, is made may be a period where the turbine outlet temperature at an actual takeoff of the airplane 13 in the ACARS data is not more than a reference temperature. Or, a period where no prediction of the turbine outlet temperature, by using the turbine outlet temperature model, is made may be a period until the reference number of flights has been completed after the last washing of the jet engine 1.

Or, a period where no prediction of the turbine outlet temperature, by using the turbine outlet temperature model, is made may be a period until reference hours have elapsed after the last washing of the jet engine 1. Or, a period where no prediction of the turbine outlet temperature, by using the turbine outlet temperature model, is made may be a period until the next-explained learning for identifying the coefficients with respect to the parameters used as the explanatory variables of the turbine outlet temperature model has been finished.

As explained above, the coefficients with respect to the parameters used as the explanatory variables of the turbine outlet temperature model are identified through the above mentioned learning.

This learning is a regression learning for identifying the coefficients by substituting the turbine outlet temperature measured by a sensor (not shown in the figures) at an actual takeoff of the airplane 13 for an objective variable of the turbine outlet temperature model. To the regression learning, applicable is a method for extracting relationship between the explanatory variables and the objective variable by using some sort of learning processes. Specifically, a linear regression analysis, a ridge regression analysis, a Kernel regression analysis, a regression analysis to which the Gaussian process is applied, a non-linear regression analysis, and so on may be adopted as a method for the regression learning, for example.

As explained above, the turbine outlet temperature measured by a sensor at an actual takeoff of the airplane 13 is used in the learning. This turbine outlet temperature is retrieved after the takeoff of the airplane 13, and then stored in the hard disk(s) 25a, 27a of the management system host(s) 25, 27 of the airline or the maintenance company. When the regression learning is made, the turbine outlet temperature is extracted from the ACARS data stored in the hard disk (s) 25a, 27a. In addition, the rotating speed of the fan 3 at an actual takeoff of the airplane is used in the learning. Note that the rotating speed of the fan 3 at an actual takeoff of the airplane 13 is predicted from the environmental and operational conditions at the actual takeoff of the airplane 13 by using the above explained control system model.

Then, a discrete distribution (residual error) of the objective variable is calculated while changing the coefficients with respect to the explanatory variables of the turbine outlet temperature, and thereby the coefficient having the narrowest discrete distribution (minimum residual error) is identified as the coefficient with respect to each explanatory variable of the turbine outlet temperature model. This regression learning is made every time when a given learning trigger is satisfied.

Note that the turbine outlet temperature model is identified for each jet engine 1. Therefore, the learning for identifying the coefficients with respect to the parameters used as the explanatory variables of the model is also made for each jet engine 1.

The environmental and operational conditions used for predicting the turbine outlet temperature at an actual takeoff of the airplane 13 or for predicting the rotating speed of the fan 3 at an actual takeoff of the airplane 13 are retrieved from the ACARS data and the maintenance information made by the airline or the maintenance company that operates the airplane 13, as shown in FIG. 4.

When identifying the coefficient(s) of the explanatory variable(s) of the turbine outlet temperature through the learning, the ACARS data are used for specifying the turbine outlet temperature at an actual takeoff of the airplane 13 and for specifying information on the operational conditions of the jet engine 1 at a takeoff of the airplane 13. In addition, the ACARS data are also used for specifying the jet engine 1 in order to specify a turbine outlet temperature model as a target of the learning, for specifying date/time of a use of the jet engine 1, and so on.

The identification through the learning of the turbine outlet temperature model (the identification of the coefficients of the explanatory variables) by using the ACARS data and/or the maintenance information is made in the management system host(s) 25, 27 of the airline or the maintenance company.

Next, specific steps of the predicting method of the turbine outlet temperature according to the present embodiment, that are done in the management system host(s) 25, 27 of the airline or the maintenance company (i.e. the predicting apparatus), will be explained with respect to flowcharts shown in FIG. 8 to FIG. 10.

Figure 8:
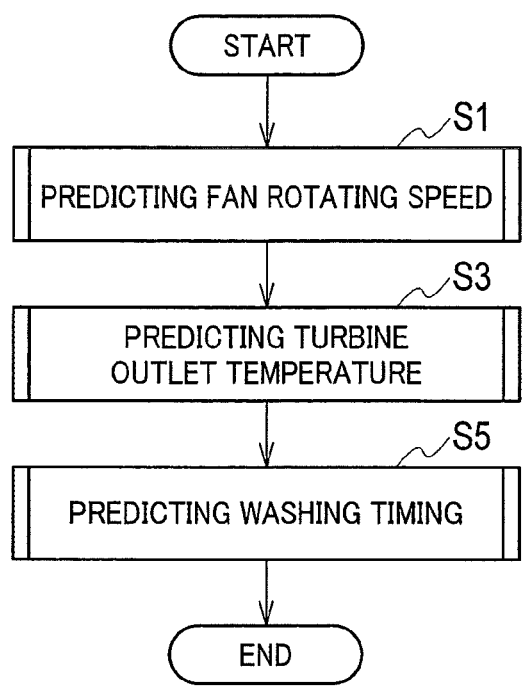
FIG. 8 is a flowchart of a predicting method according to the embodiment.

As shown by the flowchart in FIG. 8, the predicting method of the turbine outlet temperature of the jet engine 1, done by the management system host(s) 25, 27, includes the prediction of the rotating speed of the fan 3 (step S1), the prediction of the turbine outlet temperature (step S3) and the prediction of the washing timing (step S5).

Figure 9:
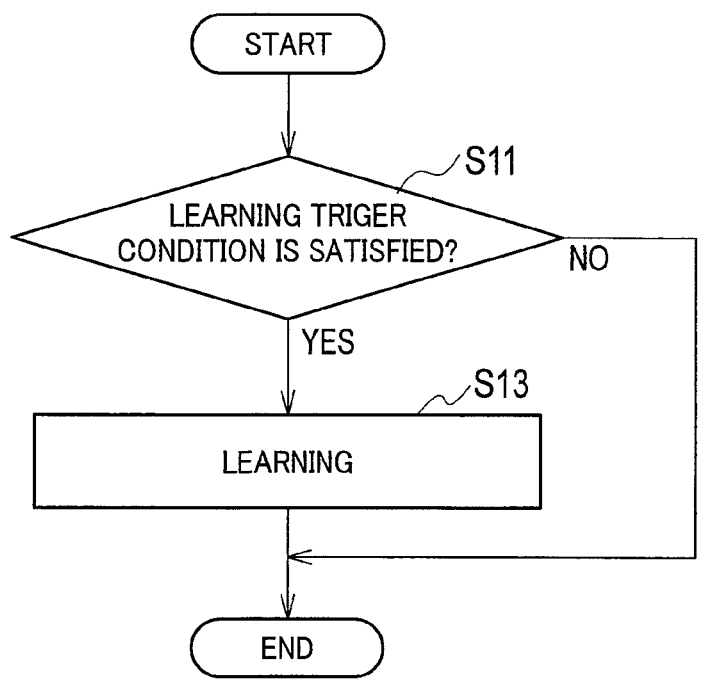
FIG. 9 is a flowchart that shows processes for executing the predicting method.

In addition, as shown in the flowchart in FIG. 9, the predicting method of the turbine outlet temperature done by the management system host(s) 25, 27 includes the learning (step S13) made when the above mentioned learning trigger condition is satisfied (YES in step S11).

Figure 10:
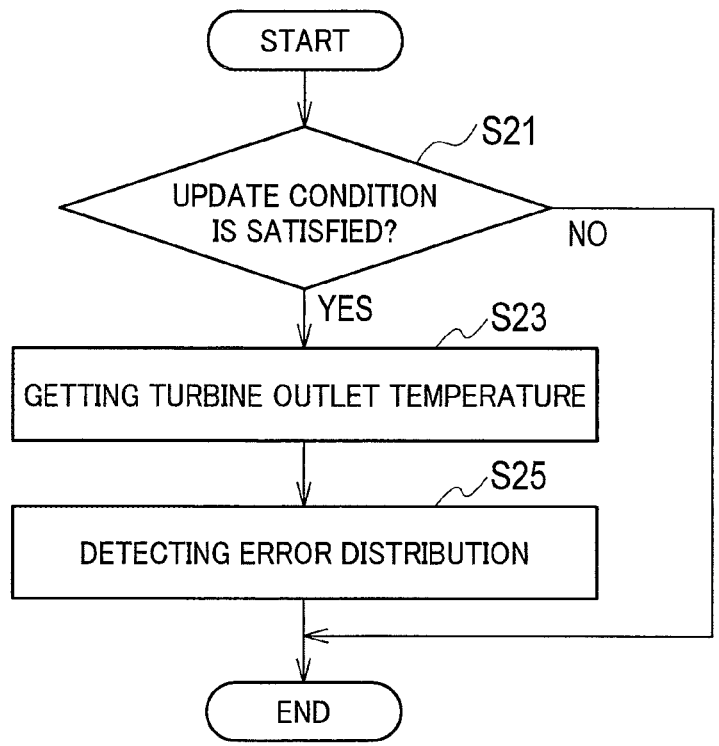
FIG. 10 is a flowchart that shows processes for executing the predicting method.

Further, as shown in the flowchart in FIG. 10, the predicting method of the turbine outlet temperature done by the management system host(s) 25, 27 includes retrieval of the turbine outlet temperature (step S23) and detection of the error distribution of the turbine outlet temperature (step S25) that are done when an update condition is satisfied (YES in step S21).

Figure 11:
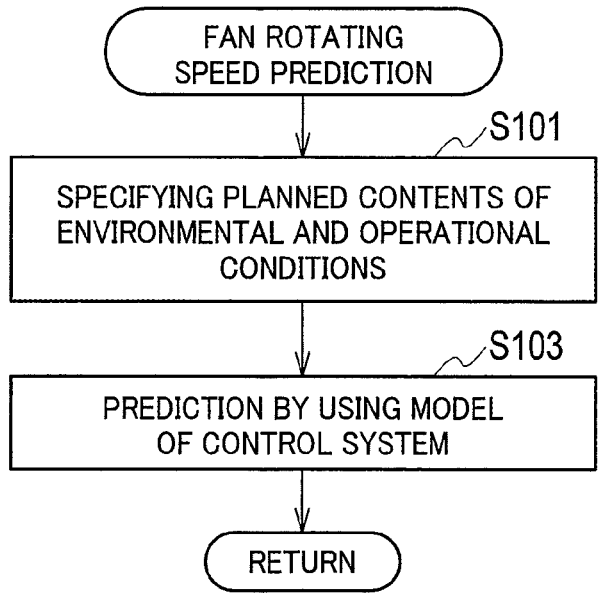
FIG. 11 is a flowchart of rotating speed prediction in FIG. 8.

In the prediction of the rotating speed of the fan 3 (step S1) shown in FIG. 8, environmental and operational conditions planned for a future takeoff of the airplane 13 are specified first (step S101), as shown in the flowchart in FIG. 11. Then, the rotating speed of the fan 3 at the future takeoff of the airplane 13 is predicted by the control system model by using the specified environmental and operational conditions (step S103).

Note that, as explained above, the environmental and operational conditions planned for the future takeoff of the airplane 13 can be specified from the weather forecast data of future date/time for the takeoff of the airplane 13, the operation schedule of the airplane 13 and so on.

Then, the rotating speed of the fan 3 at the future takeoff of the airplane 13 predicted by the control system model and the environmental and operational conditions of the jet engine 1, used for that prediction, at the future takeoff of the airplane 13 are associated with each other, and then stored in the learning database (see FIG. 6) stored in the hard disk(s) 25a, 27a of the management system host(s) 25, 27 of the airline or the maintenance company.

Subsequently, first in the prediction of the turbine outlet temperature (step S3) shown in FIG. 8, the rotational speed of the fan 3 at the future takeoff of the airplane 13, that was predicted in the above step S103 (FIG. 11), is retrieved (step S301), as shown in the flowchart in FIG. 12.

In addition, the coefficients of the parameters (the coefficients with respect to the explanatory variables) of the turbine outlet temperature model, identified through the above explained learning in the step S13 (FIG. 9) are extracted (step S303). With respect to the step S301 and the step S303, any one of them can be done prior to the other, or they can be done concurrently with other.

Then, the turbine outlet temperature at the future takeoff of the airplane 13 is predicted as the objective variable (step S305) by the turbine outlet temperature model by using the rotating speed of the fan 3 that is extracted in the step S301 and the parameters whose coefficients are extracted in the step S303 as the explanatory variables.

Figure 13:
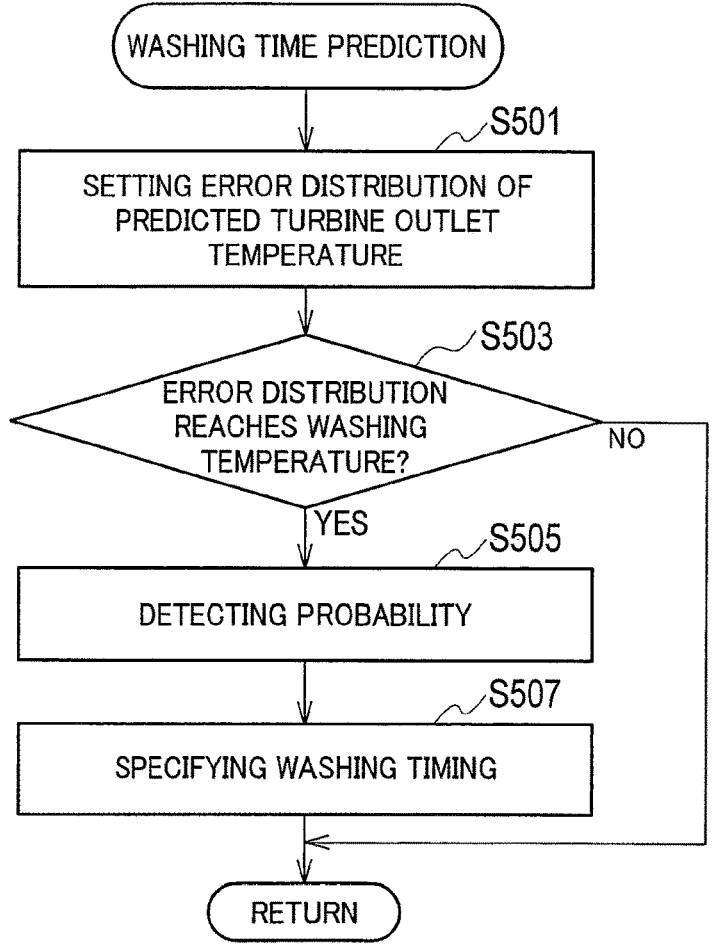
FIG. 13 is a flowchart of washing time prediction in FIG. 8.

Subsequently, first in the prediction of the washing timing (step S5) shown in FIG. 8, the error distribution detected in the step S25 (FIG. 10) is set as the error distribution of the turbine outlet temperature at the future takeoff of the airplane 13 that is predicted in the step S305 (FIG. 11) (step S501), as shown in the flowchart in FIG. 13.

Then, it is judged whether or not an upper-limit side of the error distribution, whose median is the above explained turbine outlet temperature at the future takeoff of the airplane 13 predicted in the step S305 (FIG. 12), reaches the washing temperature (step S503). When the upper-limit side of the error distribution reaches the washing temperature (YES in step S503), detected is the probability of a rise of the turbine outlet temperature at the future takeoff of the airplane 13 up to the washing temperature (step S505) based on the percentage for exceeding the washing temperature in the error distribution.

Subsequently, the washing timing of the jet engine 1 is specified (step S507) by determining, from magnitude of the probability detected in the step S505, whether or not the above explained turbine outlet temperature at the future takeoff of the airplane 13 predicted in the step S305 (FIG. 12) reaches the washing temperature. Note that, when the upper-limit side of the error distribution doesn't reach the washing temperature in the step S503 (NO in step S503), a process flow in FIG. 13 is once ended.

In the learning (step S13) made when the above explained learning trigger condition is satisfied in the step S11 (FIG. 9) (YES in step S11), the coefficients of the parameters used as the explanatory variables (the coefficients with respect to the explanatory variables) of the turbine outlet temperature model are identified by using the rotating speed of the fan 3, the environmental and operational conditions of the jet engine 1 and the turbine outlet temperature at an actual takeoff of the airplane 13 that are stored in the hard disk(s) 25a, 27a of the management system host(s) 25, 27.

Therefore, in the step S303 (FIG. 12), the identified latest coefficients of the parameters are extracted from the environmental and operational conditions in order to use the coefficients of the latest parameters identified through the learning of the step S13 (FIG. 9) as the coefficients with respect to the explanatory variables of the turbine outlet temperature model.

Note that the rotating speed of the fan 3, the environmental and operational conditions of the jet engine 1 and the turbine outlet temperature at an actual takeoff of the airplane 13 may be made unused in the learning in the step S13 within a period until the number of flights of the airplane 13 after washing of the jet engine 1 reaches at least predetermined times (e.g. five times after washing), or within a period until flight hours of the airplane 13 after washing of the jet engine 1 reach predetermined hours.

Namely, as explained above, the increase rate of the turbine outlet temperature along with an increase of deposits of the jet engine 1 caused by the repeated flight of the airplane 13 is obviously smaller at a time when just after washing of the jet engine 1 than that at a time when many flights have been made repeatedly after washing of the jet engine 1.

Therefore, even by making the regression learning by using the rotating speed of the fan 3, the environmental and operational conditions of the jet engine 1 and the turbine outlet temperature at an actual takeoff of the airplane 13 just after the washing of the jet engine 1, it is impossible to identify appropriate coefficients. Thus, the rotating speed of the fan 3, the environmental and operational conditions of the jet engine 1 and the turbine outlet temperature at an actual takeoff of the airplane 13 just after the washing of the jet engine 1 may be excluded from a target of the learning.

In the predicting apparatus of the turbine outlet temperature (the management system host(s) 25, 27) according to the present embodiment, in a case of executing the above mentioned exclusion process from the target of the learning in the step S13 (FIG. 9), a hardware(s) and a software(s) that execute the exclusion process configure a learning exclusion setter. Specifically, in the present embodiment, the hardware(s) and the software(s) of the management system host(s) 25, 27 function as the learning exclusion setter.

Note that, for example, the learning trigger condition in the step S11 (FIG. 9) may be a condition that is satisfied every time when the rotating speed of the fan 3, the environmental and operational conditions of the jet engine 1 and the turbine outlet temperature at an actual takeoff of the airplane 13 are newly saved in the learning database stored in the hard disk(s) 25a, 27a of the management system host(s) 25, 27.

Or, the learning trigger condition may be a condition that is satisfied every time when the turbine outlet temperature at a future takeoff of the airplane 13 is predicted by using the turbine outlet temperature model. The learning trigger condition may be a condition that is satisfied periodically at fixed time intervals. The learning trigger condition may be a condition that is satisfied at a timing determined randomly based on a random number list or the like. The learning is made repeatedly when the learning trigger condition is satisfied, so that the coefficients with respect to the explanatory variables are optimized.

In addition, when judging whether or not the update condition is satisfied in the step S21 (FIG. 10), it is judged whether or not an actual turbine outlet temperature has been input for a takeoff of the airplane 13 for which the turbine outlet temperature has been predicted in the past. For example, this judgement is done based on whether the ACARS data, for which a departure time (incl. date), a flight number, a departure place and a jet engine 1 identical to those at a takeoff predicted in the past were assigned, are input or not.

In the step S23, in a case where the update condition is satisfied (YES in step S21), the turbine outlet temperature at the actual takeoff of the airplane 13 is retrieved from the ACARS data that have been input.

In the step S25 next to the step S23, the turbine outlet temperature at the actual takeoff that is retrieved in the step S23 is regarded as a median (actually measured value) and a normal distribution (see FIG. 7A) of errors of the turbine outlet temperature (predicted value) predicted for that takeoff (step S305 in FIG. 12) in the past is calculated. The calculated normal distribution is the error distribution.

Figure 12:
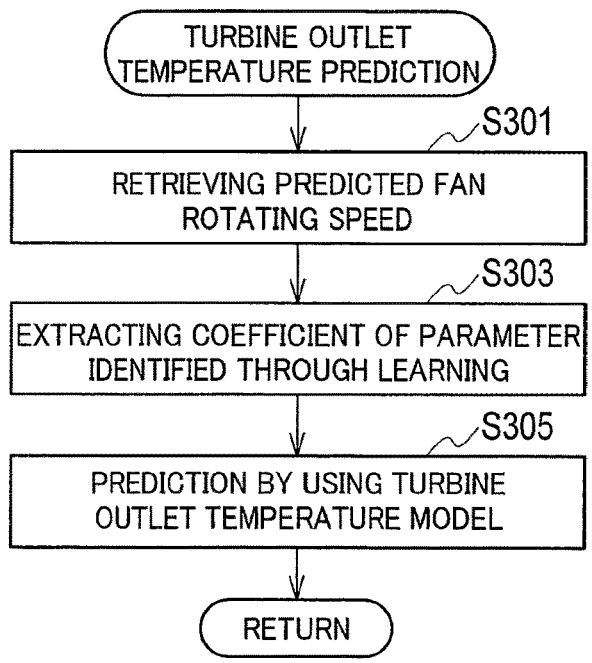
FIG. 12 is a flowchart of turbine outlet temperature prediction in FIG. 8.

Therefore, in the step S501 (FIG. 13), the latest error distribution detected in the step S25 (FIG. 10) is set as the error distribution of the turbine outlet temperature (predicted value) that was predicted, with respect to the turbine outlet temperature at an actual takeoff that is retrieved in the step S23, for that takeoff in the past (step S305 in FIG. 12).

In the predicting method according to the present embodiment, the step S103 (FIG. 11) corresponds to a rotating speed prediction step. The step S305 (FIG. 12) corresponds to an outlet temperature prediction step. The step S13 (FIG. 9) corresponds to a learning step. The step S5 (FIG. 8) corresponds to a washing timing prediction step. The step S25 (FIG. 10) corresponds to an error distribution detection step.

Note that, in the predicting apparatus according to the present, a rotating speed predictor is configured by the hardware(s) and the software(s) of the management system host(s) 25, 27 for predicting the rotating speed of the fan 3 at takeoff of the airplane 13 by executing the process of the step S103 (FIG. 11). An outlet temperature predictor is configured by the hardware(s) and the software(s) of the management system host(s) 25, 27 for predicting the turbine outlet temperature at a takeoff of the airplane 13 by executing the process of the step S305 (FIG. 12). A washing timing predictor is configured by the hardware(s) and the software(s) of the management system host(s) 25, 27 for executing the process of the washing timing prediction step in the step S5 (FIG. 8). A learning executor is configured by the hardware (s) and the software (s) of the management system host(s) 25, 27 for executing the process of the learning step in the step S13 (FIG. 9). An error distribution detector is configured by the hardware (s) and the software (s) of the management system host (s) 25, 27 for executing the error distribution detection step in the step S25 (FIG. 10).

Figure 14A:
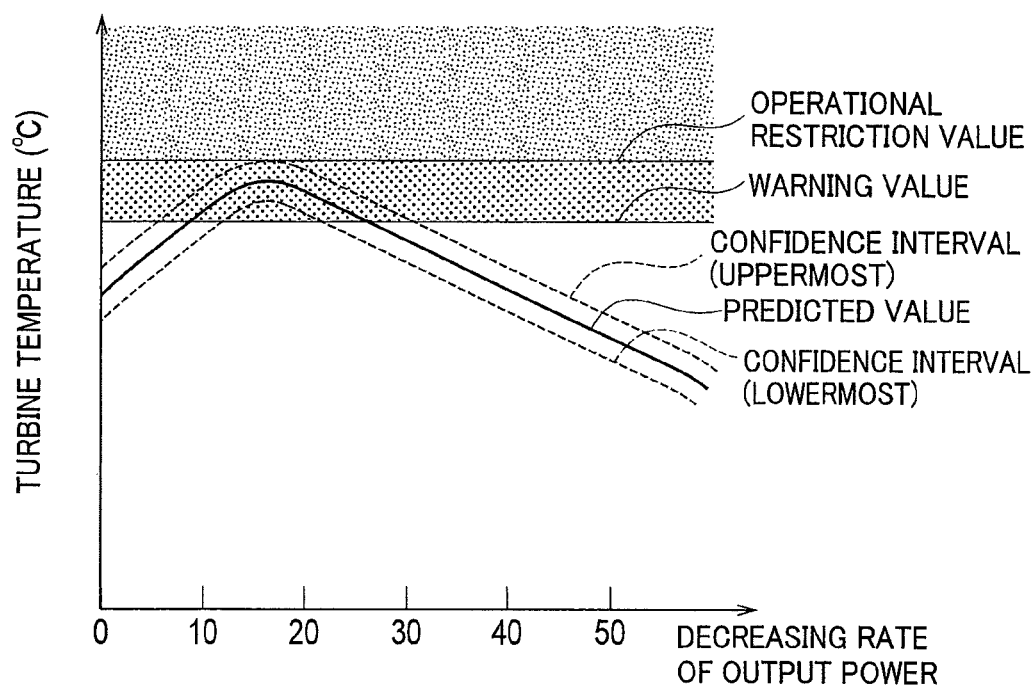
FIG. 14A is a graph that shows a relation between a predicted value and a decreasing rate of an output power.
Figure 14B:
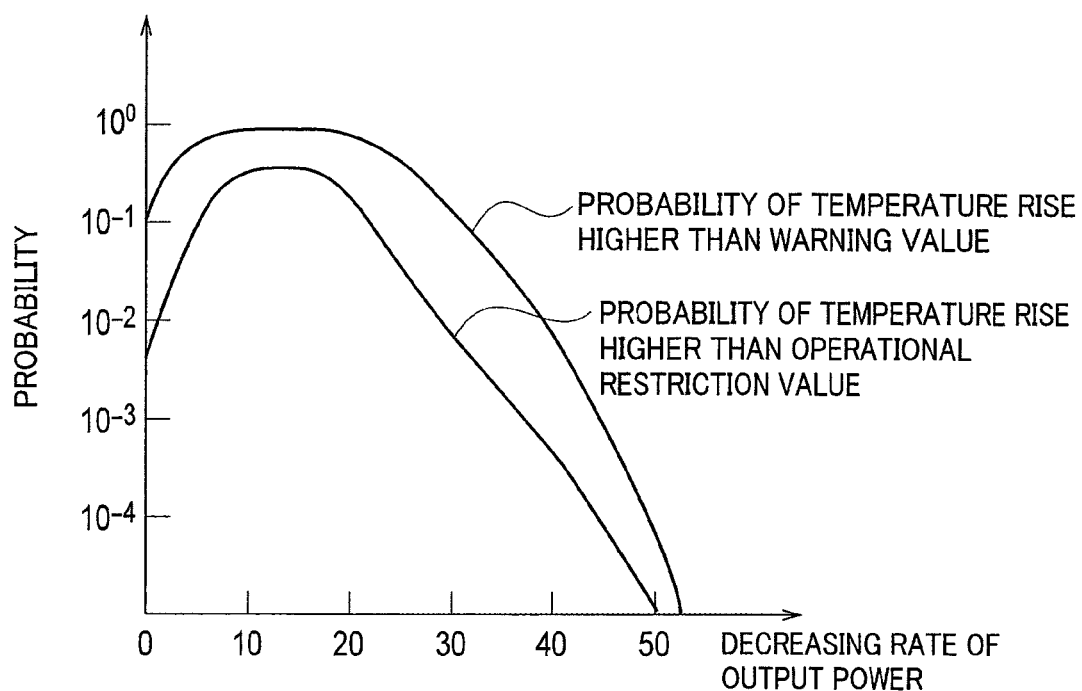
FIG. 14B is a graph that shows a relations between probabilities and a decreasing rate of an output power.

Note that, in the predicting apparatus according to the present embodiment, graphs (predicted results) shown in FIG. 14A and FIG. 14B are also displayed on a screen of a monitor (not shown in the figures) of the management system host(s) 25, 27.

In the graph shown in FIG. 14A, the predicted turbine outlet temperature is displayed for each jet engine 1. In the graph shown in FIG. 14B, analysis results such as the percentage for exceeding the washing temperature are displayed for each jet engine 1.

Specifically, in the graph shown in FIG. 14A, the predicted turbine outlet temperature (a solid line "PREDICTED VALUE"), a range of its error (an area between dashed lines "CONFIDENCE INTERVAL (UPPERMOST)" and "CONFIDENCE INTERVAL (LOWERMOST)") and an operational restriction value ("OPERATIONAL RESTRICTION VALUE") are shown. In this graph, a lowermost of a roughly dotted portion indicates washing temperature (a warning value), and a lowermost of a finely-dotted portion indicates the upper limit temperature (operational restriction value) for restricting deterioration of components.

In addition, in the graph shown in FIG. 14B, shown are a probability of an excess of the turbine outlet temperature over the washing temperature (warning value) (an upper line) and a probability of an excess thereof over the upper limit temperature (operational restriction value) (a lower line). The vertical axis of each graph in FIG. 14A and FIG. 14B indicates a decreasing rate of the output power of the jet engine 1.

According to the method and the apparatus for predicting the turbine output temperature in the present embodiment, the rotating speed of the fan 3 is predicted by using the control system model that is a fixed physical model made by modeling control operations of the jet engine 1. Thus, the turbine outlet temperature is predicted by the turbine outlet temperature model that uses the predicted rotating speed of the fan 3 and the parameters selected from the environmental and operational conditions of the jet engine 1 as the explanatory variables.

While actual measurements of the turbine outlet temperature increase, rising tendency of the turbine outlet temperature changes due to a state of deposits of the jet engine 1. Thus, the coefficients, used for predicting the turbine outlet temperature, with respect to the explanatory variables of the turbine outlet temperature model are updated through the learning.

Therefore, the turbine outlet temperature can be predicted with high accuracy by the turbine outlet temperature model by using the appropriate coefficients identified through the learning with respect to the explanatory variables.

As the result, even for a future where environmental and operational conditions that affect the turbine outlet temperature are not yet fixed, the turbine outlet temperature can be predicted without depending on a richly-experienced maintenance crew.

In addition, according to the present embodiment, the washing timing when the turbine outlet temperature at a takeoff of the airplane 13 reaches the washing temperature that requires washing is predicted based on the predicted turbine outlet temperature.

Therefore, an appropriate timing for removing deposits by washing to improve combustion efficiency of the jet engine 1 is predicted before the turbine outlet temperature at a takeoff the airplane 13 when the jet engine 1 is subject to the highest load rises to the upper limit temperature that requires a component replacement(s). By predicting the timing appropriate for washing in this manner, washing(s) of the jet engine 1 can be done efficiently in a planned manner.

Further, according to the present embodiment, when predicting the turbine outlet temperature at a future takeoff of an airplane 13, the probability of a rise of the predicted turbine outlet temperature up to the washing temperature is also calculated in consideration of the error distribution of, with respect to the turbine outlet temperature measured at an actual takeoff of the airplane 13, the turbine outlet temperature for that takeoff predicted in the past. Therefore, the washing timing appropriate for the jet engine 1 can be preliminarily determined efficiently in a planned manner due to the high probability of a rise of the turbine outlet temperature at a future takeoff of the airplane 13 up to the washing temperature.

Furthermore, according to the present embodiment, the turbine outlet temperature measured at an actual takeoff of the airplane 13 just after the washing of the jet engine 1, the environmental and operational conditions of the jet engine 1 at an actual takeoff just after the washing, and the rotating speed of the fan 3 at an actual takeoff predicted just after the washing are excluded from a target of the learning for identifying the coefficients with respect to the explanatory variables of the turbine outlet temperature model.

Namely, the regression learning is made by using the turbine outlet temperature measured at an actual takeoff of the airplane 13, the environmental and operational condition of the jet engine 1 at an actual takeoff and the rotating speed of the fan 3 at an actual takeoff when an increase rate of the turbine outlet temperature becomes larger by increasing of deposits of the jet engine 1 due to repeated flights of the airplane 13 after washing of the jet engine 1 than just after washing. As the result, the coefficients with respect to the explanatory variables of the turbine outlet temperature model can be identified appropriately.

Note that the predicting apparatus for carrying out the predicting method of the turbine outlet temperature of the gas turbine may be provided in at least one that carries out maintenances of the jet engine 1 of the management system host 25 of the airline or the management system host 27 of the maintenance company. Of course, the predicting apparatus may be provided in each of them.

In addition, the abovementioned predicting method and apparatus is not limited to be applied to the jet engine 1 of the airplane 13, but can be applied when predicting the turbine outlet temperature of a gas turbine or the like that is used as an electricity generating facility on land, a propulsion source and an electricity generating apparatus for ships and vessels, and so on.

What is claimed is:

1. A method for predicting a turbine outlet temperature at a future use of a gas turbine based on a past use of the gas turbine, the gas turbine getting an output power by compressing air introduced by a fan and then combusting the air together with fuel, the method comprising:
- an outlet temperature prediction step for predicting, by a turbine outlet temperature model, the turbine outlet temperature at the future use that is an objective variable by using at least one parameter in environmental and operational conditions planned for the future use of the gas turbine and a rotating speed of the fan planned for the future use as explanatory variables; and
- a learning step for identifying coefficients with respect to the explanatory variables, the learning step being done every time when a given learning trigger is satisfied,
- wherein, in the learning step, based on a result of a regression learning of the explanatory variables and the objective variable of the turbine outlet temperature model that is made by using the parameter, the rotating speed of the fan and the turbine outlet temperature at the past use of the gas turbine.

2. The method for predicting the turbine outlet temperature according to claim 1, further comprising:
- a rotating speed prediction step for predicting, by a control system model of the gas turbine, the rotating speed of the fan at the future use of the gas turbine by using the environmental and operational conditions planned for the future use,
- wherein the rotating speed of the fan at the future use that is predicted in the rotating speed prediction step is used as the rotating speed of the fan planned for the future use that is used in the outlet temperature prediction step.

3. The method for predicting the turbine outlet temperature according to claim 1, further comprising:
- a washing timing prediction step for predicting a washing timing when the turbine outlet temperature at the future use will reach a washing temperature that requires washing of the gas turbine based on a plurality of turbine outlet temperatures at future uses predicted in the outlet temperature prediction step.

4. The method for predicting the turbine outlet temperature according to claim 3, further comprising:
- an error distribution detection step for detecting, every time when a given update condition is satisfied, an error distribution of, with respect to the turbine outlet temperature at a use of the gas turbine after the given update condition is satisfied, the turbine outlet temperature predicted in a past in the outlet temperature prediction step for the turbine outlet temperature at the use of the gas turbine after the given update condition is satisfied,
- wherein, in the washing timing prediction step, the washing timing is predicted by using a percentage corresponding to an excess over the washing temperature in the error distribution whose representative value is the turbine outlet temperature predicted in the outlet temperature prediction step as a probability of a rise of the turbine outlet temperature at the future use up to the washing temperature.

5. The method for predicting the turbine outlet temperature according to claim 1, wherein
- the rotating speed of the fan and the parameter within a period until the number of uses of the gas turbine after washing of the gas turbine reaches a predetermined times or within a period until used hours of the gas turbine after washing of the gas turbine reach predetermined hours, are excluded from a target of the regression learning in the learning step.

6. The method for predicting the turbine outlet temperature according to claim 1,
- wherein, when a given start condition is satisfied after washing of the gas turbine, the turbine outlet temperature is predicted in the outlet temperature prediction step.

7. An apparatus for predicting a turbine outlet temperature comprising:
- an outlet temperature predictor that predicts, by a turbine outlet temperature model, the turbine outlet temperature at a future use of a gas turbine that is an objective variable by using at least one parameter in environmental and operational conditions at the future use of the gas turbine and a rotating speed of a fan at the future use as explanatory variables;
- a leaning data storage that stores a learning database in which the parameter and the rotating speed of the fan at a past use of the gas turbine are associated with the turbine outlet temperature at the past use; and
- a learning executor that identifies, every time when a given learning trigger is satisfied, coefficients with respect to the explanatory variables based on a result of a regression learning of the explanatory variables and the objective variable of the turbine outlet temperature model that is made by using the parameter, the rotating speed of the fan and the turbine outlet temperature associated therewith in the learning database stored in the leaning data storage.

8. The apparatus for predicting the turbine outlet temperature according to claim 7, further comprising:
- a rotating speed predictor that predicts, by a control system model of the gas turbine, the rotating speed of the fan at the future use of the gas turbine by using the environmental and operational conditions at the future use,
- wherein the outlet temperature predictor uses the rotating speed of the fan at the future use that is predicted by the rotating speed predictor as the explanatory variable for predicting the turbine outlet temperature by using the turbine outlet temperature model.

9. The apparatus for predicting the turbine outlet temperature according to claim 7, further comprising:
- a washing timing predictor that predicts a washing timing when the turbine outlet temperature at the future use will reach a washing temperature that requires washing of the gas turbine based on a plurality of turbine outlet temperatures at future uses predicted by the outlet temperature predictor.

10. The apparatus for predicting the turbine outlet temperature according to claim 9, further comprising:
- an error distribution detector that detects, every time when a given update condition is satisfied, an error distribution of, with respect to the turbine outlet temperature at a use of the gas turbine after the given update condition is satisfied, the turbine outlet temperature predicted in a past by the outlet temperature predictor for the turbine outlet temperature at the use of the gas turbine after the given update condition is satisfied,
- wherein the washing timing predictor predicts the washing timing by using a percentage corresponding to an excess over the washing temperature in the error distribution whose representative value is the turbine outlet temperature predicted by the outlet temperature predictor as a probability of a rise of the turbine outlet temperature at the future use up to the washing temperature.

11. The apparatus for predicting the turbine outlet temperature according to claim 7, further comprising:
a learning exclusion setter that excludes, from a target of the regression learning by the learning executor, the rotating speed of the fan and the parameter within a period until the number of uses of the gas turbine after washing of the gas turbine reaches a predetermined times or within a period until used hours of the gas turbine after washing of the gas turbine reach predetermined hours,
wherein the learning executor makes the regression learning by using the rotating speed of the fan and the parameter in the learning database stored in the learning data storage, other than the rotating speed of the fan and the parameter that are excluded by the learning exclusion setter.

12. The apparatus for predicting the turbine outlet temperature according to claim 7,
wherein, when a given start condition is satisfied after washing of the gas turbine, the outlet temperature predictor predicts the turbine outlet temperature.

* * * * *